US010060020B2

(12) United States Patent
Verpoort et al.

(10) Patent No.: US 10,060,020 B2
(45) Date of Patent: Aug. 28, 2018

(54) DEVICE FOR THERMALLY COATING A SURFACE

(71) Applicant: Ford Global Technologies, LLC, Dearborn, MI (US)

(72) Inventors: Clemens Maria Verpoort, Monheim (DE); Leander Schramm, Remda-Teichel (DE); Enrico Hauser, Langenbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 398 days.

(21) Appl. No.: 14/759,152

(22) PCT Filed: Dec. 19, 2013

(86) PCT No.: PCT/EP2013/077414
§ 371 (c)(1),
(2) Date: Jul. 2, 2015

(87) PCT Pub. No.: WO2014/106591
PCT Pub. Date: Jul. 10, 2014

(65) Prior Publication Data
US 2015/0376759 A1 Dec. 31, 2015

(30) Foreign Application Priority Data
Jan. 4, 2013 (DE) ........................ 10 2013 200 067

(51) Int. Cl.
*B23K 11/00* (2006.01)
*C23C 4/12* (2016.01)
*B05B 7/22* (2006.01)
*C23C 4/131* (2016.01)
*B05B 15/50* (2018.01)
*B05B 13/06* (2006.01)

(52) U.S. Cl.
CPC .............. *C23C 4/125* (2013.01); *B05B 7/224* (2013.01); *B05B 15/50* (2018.02); *C23C 4/131* (2016.01); *B05B 13/0636* (2013.01)

(58) Field of Classification Search
CPC ........ B23K 11/00; B23K 10/00; B23K 10/02; B05B 7/18; B05B 7/224; B05B 13/0636; C23C 4/125; C23C 4/131; C23C 4/127
USPC .............................. 219/76.14, 76.16, 121.47
See application file for complete search history.

(56) References Cited

U.S. PATENT DOCUMENTS 3,055,591 A 9/1962 Shepard
5,808,270 A 9/1998 Marantz et al.
5,938,944 A * 8/1999 Baughman .............. B05B 7/224 219/121.47

(Continued)

FOREIGN PATENT DOCUMENTS

CN 1242720 A 1/2000
DE 102006023483 A1 11/2007

(Continued)

*Primary Examiner* — Brian Jennison
(74) *Attorney, Agent, or Firm* — Marla Johnston; McCoy Russell LLP

(57) ABSTRACT

The invention relates to a device for thermally coating a surface, which has at least one housing, a cathode, which is designed as a consumable wire and at least one insulation element, wherein the housing has a non-detachable anti-adhesion layer.

20 Claims, 12 Drawing Sheets

(56) References Cited

U.S. PATENT DOCUMENTS

| | | | | |
|---|---|---|---|---|
| 6,372,298 | B1 * | 4/2002 | Marantz | B05B 7/224 219/121.5 |
| 6,478,843 | B1 * | 11/2002 | Wittdorf | B23K 9/235 219/119 |
| 6,498,316 | B1 * | 12/2002 | Aher | B23K 10/00 219/121.39 |
| 6,610,959 | B2 | 8/2003 | Carlson et al. | |
| 6,732,298 | B1 | 5/2004 | Murthy et al. | |
| 6,706,993 | B1 | 6/2004 | Chancey et al. | |
| 2004/0035838 | A1 * | 2/2004 | Merard | A61L 2/14 219/121.43 |
| 2007/0045258 | A1 * | 3/2007 | Yamazaki | B23K 26/0884 219/121.84 |
| 2012/0018407 | A1 * | 1/2012 | Schramm | B05B 7/224 219/76.16 |

FOREIGN PATENT DOCUMENTS

| | | | |
|---|---|---|---|
| DE | 102008016041 | A1 | 1/2009 |
| DE | 102009023603 | A1 | 12/2010 |
| EP | 1980328 | A1 | 10/2008 |
| JP | 61245978 | A | 11/1986 |
| WO | 9835760 | A1 | 8/1998 |
| WO | 0108810 | A1 | 2/2001 |
| WO | 2008125356 | A1 | 10/2008 |
| WO | 2010112567 | A1 | 10/2010 |
| WO | 2012095371 | A1 | 7/2012 |
| WO | 2014106591 | A1 | 7/2014 |

* cited by examiner

DEVICE FOR THERMALLY COATING A SURFACE

CROSS REFERENCE TO RELATED APPLICATIONS

The present application is a U.S. National Phase of International Patent Application Serial No. PCT/EP2013/077414, entitled "APPARATUS FOR THERMALLY COATING A SURFACE," filed on Dec. 19, 2013, which claims priority to German Application No. 10 2013 200 067.7, filed on Jan. 4, 2013, the entire contents of each of which are hereby incorporated by reference for all purposes.

FIELD

The present invention relates to a device for thermally coating a surface, having the features of the preamble of claim 1.

BACKGROUND AND SUMMARY

DE 10 2009 023 603 A1 relates to an extraction device for extracting waste particles during the thermal coating of an inner surface to be coated of at least one bore in a component. The extraction device has at least one extraction tube, which can be arranged below the bore. Here, there is a concern for a particular clearance. It is also disclosed that an inner surface of the extraction tube is polished so as to be smooth and/or is coated with an anti-adhesion coating.

DE 10 2006 230483 A1 relates to a device for cold gas spraying, in which gas and spray particles are accelerated. The cold gas spray nozzle is at least partially coated on the inner wall thereof to enable the use of hotter gases and spray particles than previous spray nozzles. The coating is intended to prevent the hot spray particles from caking the inner wall of the nozzle.

A ceramic-sheathed torch nozzle for shielded arc welding processes is known from JP 61-245978 A. In this case, the ceramic sheath is applied by means of plasma flame spraying. The ceramic sheath is then ground in order to avoid adhesion of welding splashes.

WO 2008/125356 A1 relates to an expansion nozzle, which has a convergent region, a divergent region, and a constricted region situated between them. The inner contour of the expansion nozzle can be subjected to surface treatment (e.g., polishing and/or coating).

A spray gun is disclosed in U.S. Pat. No. 3,055,591. A front end of the nozzle is embodied in the form of a reflector and is provided with a polished reflection surface for radiant heat. The intention is to ensure that the heat which arises at the tip of the melting wire impinges upon the reflecting surface and is accordingly reflected back onto the molten particles and the tip of the wire.

Devices for thermally coating a surface are described in U.S. Pat. No. 6,372,298 B1, U.S. Pat. No. 6,706,993 B1 and WO2010/112567 A1, for example. Devices mentioned therein have the following in common: a wire feed device for feeding a consumable wire, wherein the wire acts as an electrode; a source of plasma gas for producing a plasma gas stream; a nozzle body having a nozzle opening, through which the plasma gas stream is directed as a plasma gas jet at one wire end; and a second electrode, which is arranged in the plasma gas stream before said stream enters the nozzle opening. U.S. Pat. No. 6,610,959 B2 and WO2012/95371 A1 are also concerned with devices of this kind.

An arc forms through the nozzle opening between the two electrodes. The plasma jet emerging from the nozzle opening impinges upon the wire end and, in combination with the arc, causes the wire end to melt. By means of the plasma jet, the melted wire material is carried away in the direction of the surface to be coated. Arranged in a ring shape around a nozzle opening are secondary air nozzles, which produce a secondary gas jet that impinges upon the material that has melted off the wire end and thus accelerate the transfer of the melted material in the direction of the surface to be coated, in addition to providing a secondary optimization of the melted wire material.

Present-day internal combustion engines or the engine blocks thereof can be cast from a metal or light metal, e.g. aluminum, aluminum blocks in particular having an iron or metal layer on the cylinder bores thereof. The metal layer can be sprayed on by thermal processes. In addition to twin-wire arc spraying methods (TWA), HVOF spraying methods and plasma-powder spraying methods, known thermal spraying methods include plasma-wire spraying methods or PTWA (plasma transferred wire arc) methods. Coating the cylinder bores by means of plasma wire spraying methods, i.e. by PTWA, is advantageous because it is possible in this way to produce a coating which has a positive effect in terms of a reduced wear factor and a longer service life for the engine with reduced oil consumption in comparison with conventional linings provided by cast liners made of gray cast iron.

However, the known devices for thermal coating and the methods implemented with said devices have some disadvantages. For example, the known devices are fed into a cylinder bore to be coated and, in operation, rotate upon themselves while simultaneously performing a linear up and down movement. It is evident here that during the rotation of the device, the process gases flowing in the cylinder bore are taken along by flat surfaces on the device, especially flat surfaces on the housing, in a manner similar to a blade, giving rise to additional turbulence.

For higher wire feed rates, correspondingly higher currents are required, and these simultaneously cause higher thermal stress on the devices. The heat input from the plasma and from the liquid spray particles causes intense heating of the surface of the bore, and very high surface temperatures occur. The heated process gases flowing out of the bore lead to additional heating of the devices. In addition to the high working temperatures, the spray dust and overspray particles also represent a problem for reliable long-term operation.

Not all the liquid spray particles adhere to the surface, the application efficiency in the bore being about 87%, and therefore very large quantities of dust are generated with correspondingly higher wire air feed rates of, for example, 10 kg/h. These spray dusts are hot, pasty particles, which are deflected from the (aluminum) surface or from the already formed sprayed layers by the flowing process gases in the bore. These particles can then lead to deposits on the surface of the device, especially on the housing thereof, and these can grow into thick layers as the spraying time increases and can then flake away in an uncontrolled way as large pieces, which may then embed themselves in the functional coating or lead to a short circuit on the device. This short circuit can occur as soon as a closed, electrically conductive layer has formed on the outer surface of the device.

Moreover, the known devices are dimensioned in such a way that they can no longer coat the cylinder bores in accordance with the required parameters for success owing to the ever decreasing diameter of said bores.

In order to protect the devices from the adhesion of said particles, there is a known practice of providing the devices with a removable plastic and/or rubber jacket. However, this is very difficult to apply and all the more complex to remove. Removal of the plastic and/or rubber jacket is necessary at the latest for purposes of maintenance on the device. The effective overall size is also significantly increased by the plastic and/or rubber jacket, and this is not conducive to a required coating result. Moreover, the plastic jacket will be degraded after a certain time in operation owing to the effects of the hot particles carried back, and will have to be replaced. This is not only time-consuming but also costly.

Given this situation, it is the underlying object of the invention to indicate an improved device for thermally coating surfaces, by means of which the process of spraying even small bore diameters can be carried out in a stable process.

Said object is achieved by means of a device having the features of claim 1. Further particularly advantageous embodiments of the invention are disclosed in the subclaims.

It is pointed out that the features specified individually in the following description may be combined with one another in any desired technically meaningful way and disclose further refinements of the invention. The description, in particular in conjunction with the figures, characterizes and specifies the invention further.

According to the invention, a device for thermally coating a surface comprises at least one housing, a cathode, an anode, which is designed as a consumable wire and has at least one preferably electrically and thermally acting insulation element, wherein at least the housing has a non-detachable anti-adhesion surface. In the sense according to the invention, an anti-adhesion surface is an anti-adhesion and/or insulating layer or an anti-adhesion and/or insulating layer system.

The device, also referred to as a torch or torch head, is mounted on a suitable rotation device by means of a spindle. In addition to the rotary drive, the rotation device also comprises the rotary union for the process gases (primary gas/secondary gas) and the contacts for the cathode and anode potential.

The spindle thus serves as it were as a spacer/extension element from the rotation device to the torch head. The spindle guides the process gases (primary gas/secondary gas), the wire and the electric energy to the device, wherein the cathode potential is situated on the spindle housing.

The housing of the torch head can be of single-part or multipart design, preferably of two-part design with at least one main element and at least one cover element, which can be screwed to one another.

The features specified individually in the following description may apply not only to the torch head housing but also to the spindle housing or may be combined with one another on said housings or may apply partially or completely to said housings in any desired technically meaningful way and disclose further refinements of the invention.

The housing can be composed of copper, a copper alloy, especially brass, or of aluminum or an aluminum alloy, wherein the materials are, of course, not intended to be restrictive. Nevertheless, the materials mentioned are metallic materials in the sense according to the invention. In a preferred embodiment, the housing is formed from brass because of its properties, such as thermal expansion, heat capacity, thermal conductivity and surface finish, which are extremely advantageous during the operation of the device.

To reduce or avoid the adhesion of overspray and/or spray dust on the whole device, the adhesion mechanisms of the deflected/reflected particles must be taken into account, according to the additional spray material used, i.e. the wire material. The high temperatures may lead to local welding, and the molten state may lead to mechanical interlocking of some particles when they strike the surfaces of the device. By way of example, adhesion of deflected or reflected magnetized particles is avoided by using nonmagnetizable materials.

Apart from the material of the housing, it is, in particular, the surface finish which is decisive with regard to the adhesion of overspray and/or spray dust, which is to be avoided, for which reason the surface is preferably polished in order to reduce roughness, thereby counteracting deposition on the housing.

In the sense according to the invention, an anti-adhesion surface is therefore a surface on a suitable housing and/or spindle material which has at least anti-adhesion properties for the spray dust that can be expected, the roughness of which can be further reduced by suitable surface finish machining, e.g., by grinding, superfinishing, polishing or lapping. However, the housing can also have a suitable coating applied to the housing as an anti-adhesion surface in the sense according to the invention. The anti-adhesion surface is connected materially, i.e. non-detachably, to the housing, which means, in the sense according to the invention, either that the material of the housing itself forms the anti-adhesion surface or that the anti-adhesion surface is applied as a protective layer to the material of the housing, thus ensuring that the two components (housing/spindle adhesion surface) cannot be separated without destruction in any event. The anti-adhesion surface can also have electrically and thermally insulating protection functions. To improve handling and to protect the surface finish achieved, a high hardness of the housing material is expedient, or the hardness of the anti-adhesion surface can be increased by appropriate selection of the coating material of the housing.

For example, the housing can have a decorative or hard-chrome coating as an anti-adhesion surface. In the sense according to the invention, the decorative or hard-chrome coating is a metallic anti-adhesion surface and can have a layer thickness of 0.5 μm or 40 μm-100 μm, for example. After appropriate surface finish machining, the spray dust will not enter into a firm bond with said coatings. On the contrary, the spray dust which settles can only rest loosely thereon.

In general, known hard metallic materials (e.g., tungsten carbide, titanium carbide, titanium nitride) or mixed crystals of hard materials (e.g., tungsten carbide/titanium carbide, tungsten carbide/cobalt, titanium carbide/titanium nitride) or nonmetallic hard materials (e.g., diamond, silicon carbide and nitride, boron carbide and nitride, chromium oxide) may be mentioned for the possible formation of the anti-adhesion surfaces by various coating methods applied to the housing, it being possible to apply said materials by various methods (e.g., electroplating, thermal spraying, PVD, CVD), also with the formation of intermediate layers.

In a preferred embodiment, the housing can have a protective aluminum oxide layer as an anti-adhesion surface. In the sense according to the invention, the protective aluminum oxide layer is a ceramic anti-adhesion surface. This can be applied by a powder plasma spray process, for example. In this case, by way of example, a protective aluminum oxide layer with a thickness of, for example, 500 μm-1000 μm, can be applied as an additionally electrically insulating layer. After coating, the anti-adhesion surface is sealed by means of silicates, e.g. water glass, preferably while still warm from the spraying process, in order to cancel out the possibly hygroscopic property of the protective aluminum oxide layer, which could lead to the loss of the electric strength in the case of a high atmospheric humidity. Provision is then more preferably made to enable the sprayed-on protective aluminum oxide layer to be ground and/or polished in order to counteract any adhesion which is nevertheless possible on a rough surface. The electrical insulation enhances the reliability of the process since, in this way, the cathode potential of the housing is additionally advantageously isolated and thus further possibilities for the configuration of the insulation element already mentioned are also obtained, more precise details of which will be given below.

In a more preferred embodiment, the housing can have an aluminum layer as an anti-adhesion surface, which can be applied by means of a wire arc spraying process, for example, wherein the aluminum layer can have a thickness of 100 μm, for example. This layer can then be converted into a protective aluminum oxide layer, e.g. into an $Al_2O_3$ ceramic layer, by means of the MAO (micro-arc oxidation) or PEO (plasma electrolytic oxidation) process, said layer being electrically insulating and additionally preventing the adhesion of spray dust while simultaneously providing heat protection.

As already mentioned, the housing can also be formed from a heat-resistant aluminum material rather than brass. This is advantageous inasmuch as the thermal conductivity is significantly increased as compared with brass, thus allowing the flowing process gases to cool the housing more effectively on the inside. To ensure that, on the other hand, the radiant and convection heat cannot pass as quickly into the interior of the components via the surface of the spindle and of the torch, however, the anti-adhesion layer is applied externally, e.g. as an oxidic ceramic coating, e.g. by powder plasma spraying. As an alternative, an electrically insulating coating with a titanium oxide heat insulating coating having a thickness of 50 μm, for example, can be applied by means of the "MAO" (micro-arc oxidation) or the PEO (plasma electrolytic oxidation) process, for example. These anti-adhesion surfaces can then be ground and polished.

In a more preferred embodiment, the housing and/or the spindle can have a protective zirconium oxide layer as an anti-adhesion surface. In addition to the anti-adhesion property, the protective zirconium oxide layer also has a heat insulating property, thus protecting the housing against heat convection and heat radiation, and thus simultaneously further reducing the possible adhesion of spray dust to the preferably ground and/or polished anti-adhesion surface.

In an even more preferred embodiment, the housing can have a protective aluminum nitride layer as an anti-adhesion surface. By virtue of the advantageous properties of high thermal conductivity combined with good electrical insulation, high temperature stability and high hardness of aluminum nitride, heat is removed very quickly from the reflected and/or deflected particles which strike the anti-adhesion surface, with the result that the particles solidify without causing local defects in the aluminum nitride. Mechanical interlocking of the particles is avoided through the surface finish. Local destruction is avoided in particular through the use of a nitride for the coating of the housing. This ensures long-term prevention of damage to the anti-adhesion surface.

Particularly to increase the reliability of the process, it is expedient according to the invention to form the anti-adhesion surface on a layer system of different materials, wherein the anti-adhesion surface is produced on the outermost layer by suitable surface finish machining. It is thus possible to combine the different special properties of the respective coating materials in a technically expedient way.

For example, a protective aluminum oxide layer having a thickness of, for example, 500 μm-1000 μm can be applied to the housing by powder plasma spraying, and a tungsten carbide/cobalt top layer having a thickness of, for example, 100 μm-200 μm is applied to this layer by means of a further powder plasma spraying process. In this case, an additional electrically and thermally acting insulation is provided by the protective aluminum oxide layer, and the anti-adhesion surface is produced in the subsequent surface finish machining process by virtue of the high thermal conductivity and high temperature stability of the tungsten carbide/cobalt top layer.

Of course, the additional electrically and thermally acting insulation can also be achieved by means of other materials, e.g., zirconium oxide or aluminum oxide/zirconium oxide mixtures. Instead of the tungsten carbide/cobalt top layer given by way of example, other materials, e.g., chromium oxide, can also be used to form the anti-adhesion surface. Diamond, silicon oxide and especially silicon carbide coatings, which are deposited as thin layers by suitable methods (e.g., PVD, CVD) on the protective layer, which has already been surface-machined, and form the anti-adhesion surface through subsequent suitable surface finish machining, have also proven advantageous.

In a preferred embodiment, the housing is of predominantly round design. Only in the region of the nozzle opening, i.e. only on the side of a nozzle ring and only in the region of the nozzle ring, is the circular configuration of the housing as seen in cross section abandoned. Here, the housing is flattened, while there is an oblique transition to a plane in which the nozzle ring or nozzle opening is arranged. The consistent retention of the circular housing as seen in cross section avoids a blade effect, i.e. the process gases or air in a cylinder bore being taken along, thereby considerably reducing a negative influence of the blade effect on the particles to be transported in the direction of the surface to be coated. This flow-optimized surface configuration also has an effect in reducing deposits on the housing and also assists the subsequent surface finish machining to form the anti-adhesion surface.

It is expedient if the at least one insulation element is embodied as a nozzle ring, for example.

The nozzle ring is preferably made from a ceramic material, more preferably from a high-performance ceramic material, and has an electrically and thermally insulating effect between the housing and a wire guide. The nozzle ring is the only external insulator in the otherwise metallic external form of the entire device or housing. The function of the nozzle ring can also be embodied as an extension of a secondary gas nozzle.

In one possible embodiment, the nozzle ring is of funnel-shaped design and extends from an outer ring in the direction of a central opening. It is also possible to embody the nozzle ring in the manner of a sleeve with a wall portion extending away from a base flange. It is also possible to provide a funnel-shaped portion on which a wall portion extending away from the latter is arranged. The nozzle ring can be of single-part or multipart construction, wherein ceramics or materials such as silicon nitride, aluminum nitride, boron nitride, zirconium oxide, aluminum oxide, ATZ or ZTA can preferably be used to produce the nozzle ring. In a preferred embodiment, the nozzle ring is polished, more preferably to a mirror finish, at least on the surface thereof which faces away from the cathode, in order to avoid adhesions.

Surprisingly, it has been observed that good results in avoiding reflected and/or deflected particles and/or enabling them to be removed can be achieved especially by using aluminum nitride. By virtue of the particularly high thermal conductivity and relatively high temperature stability of aluminum nitride, heat is removed very quickly from the reflected and/or deflected particles which strike the polished nozzle ring surface, with the result that the particles solidify without causing local defects in the aluminum nitride. Mechanical interlocking of the particles is avoided through the surface finish.

The composite ceramic Shapal™ is another example ceramic material for the nozzle ring with a very high thermal conductivity and high electric strength.

In the event of relatively small splashes, the effect of better heat dissipation and thus of more rapid solidification of the splashes is achieved by means of the invention before these splashes destroy the surface finish of the ceramic material through local overheating and local interlocking of the particles is thus made possible.

In order to avoid adhesions on the nozzle ring, a number of measures can be provided in addition:

The nozzle ring is of multipart design and has a partial anti-adhesion and/or insulating layer on the inside.

The nozzle ring is of single-part design and has a partial anti-adhesion and/or insulating layer on the inside and on the outside.

The nozzle ring is of multipart construction and has an extended configuration.

The nozzle ring is of single-part construction and has an extended configuration.

The nozzle ring is of single-part construction, being embodied as a shielding gas nozzle with holes centrally in one plane.

The nozzle ring is of single-part construction, being embodied as a shielding gas nozzle with holes tangentially in one plane.

The nozzle ring is of single-part construction, being embodied as a shielding gas nozzle with holes tangentially in a plurality of planes.

The nozzle ring is of single-part construction, being embodied as a shielding gas nozzle with a slot and holes tangentially in a plurality of planes.

The nozzle ring is of multipart construction, being embodied as a shielding gas nozzle with a slot and tangential labyrinth holes.

It is advantageous if a shielding gas flow is introduced in order to avoid and/or remove reflected and/or deflected particles, wherein the shielding gas flow is produced continuously and/or in a pulsed manner around the spray jet. To produce the shielding gas flow, the process gases can be used and, in particular, the secondary gas can be supplied as a shielding gas. It is also possible to supply other gases as process gases, e.g. air, argon or other gases. The shielding gas can flow through centrally arranged holes and/or tangentially arranged holes in one or more planes of the nozzle ring. Moreover, flow can take place through slotted nozzles and/or slotted nozzles with centrally and/or tangentially arranged holes in one or more planes of the nozzle ring in order to stabilize the shielding gas flow. Moreover, the shielding gas flow can take place through slotted nozzles with a labyrinth comprising centrally arranged holes/slots and/or tangentially arranged holes/slots in order to stabilize said flow.

In the abovementioned formation of the anti-adhesion surface on an additionally electrically insulating layer or an additionally electrically insulating layer system of the housing, the functions of the nozzle ring can also be performed in this special case by the secondary nozzle and the electrically insulating housing.

If required, the devices having the anti-adhesion surface can be cleaned. After coating or, in some cases, also during coating of the component to be coated, dust can be blown off the torch head and the spindle by means of a linear and rotary motion in front of an air nozzle, thus allowing electrostatically adhering dust to be removed from the housings, for example. For the removal of any adhering dust, the device can, of course, also be moved in rotation in front of a fan nozzle or in a linear manner through an annular air nozzle. Air is not the only means of blowing dust off the device: compressed air can preferably be used. It is possible to clean the device with carbon dioxide (similar to liquid $CO_2$ blasting), nitrogen and/or argon. Mechanical cleaning, e.g., by means of brushes, can, of course, also be implemented with appropriate configuration of the anti-adhesion surface. Dust which is formed during the cleaning process can be supplied to the filters for disposal via the existing extraction systems.

This blow-off process additionally ensures that the torch head and/or the spindle are cooled during the cleaning process. Thus, even in the case of relatively small bores (for example, bores less than 60 mm), it is therefore possible to achieve a coating process which is stable because the device, in particular the housing thereof, is additionally cooled in a selective manner before a new coating process is carried out.

In addition, the ceramic nozzles, in particular, or preferably the nozzle ring, is freed from dust residues, for which purpose the ceramic nozzles are blasted with an annular air nozzle, for example. In order to prevent dust from penetrating into the interior of the housings, the process gases flow through the nozzle openings during the cleaning processes, i.e. even during the cleaning of the torch head housing, with possibly differing parameters. As an alternative, the nozzle opening could, by way of example, be sealed with a sealing element, e.g., with a rubber plug having a diameter of just 2 mm, for example. The sealing element is, of course, matched to the nozzle opening in order to avoid penetration of spray dust or other harmful substances.

It may be expedient if the cleaning device is arranged on the carrier module (that is to say, for example, on a robot arm) which carries the surface to be coated, that is to say, for example, the engine block with the cylinder linings to be coated. In this case, the device can be moved out of the coated bore. The carrier module moves up and down along the device with its cleaning device, that is to say preferably with its blow-off device, while the device rotates at a low speed. It may be sufficient in this case if the device is already clean after one revolution, although, of course, several revolutions about its own axis are also possible.

By means of the invention, a device is made available for coating surfaces, especially for the internal coating of cylinder linings with small diameters (e.g., less than 60 mm) of internal combustion engines, which device can be rotated about its axis and, in the case of a consumable single-wire system embodied as an anode, can internally coat even small bore diameters in a stable process, at a high application rate and with a long service life and correspondingly reduced outlay on maintenance (rotating single-wire arc spraying). It is, of course, possible not only to consume solid wires but also to consume filler wires. The electrical and thermal insulators required for operation in a reliable process are situated within the otherwise metallic external housing of the overall device (the preferred material, brass, is also referred to as metallic in the sense according to the invention). It is only in the region of the particle jet exit opening that electrical and thermal insulators are used.

BRIEF DESCRIPTION OF THE DRAWINGS

Further advantageous details and effects of the invention will be explained in more detail below on the basis of various exemplary embodiments illustrated in the figures. In the figures.

DETAILED DESCRIPTION OF THE DRAWINGS

Figure 2:
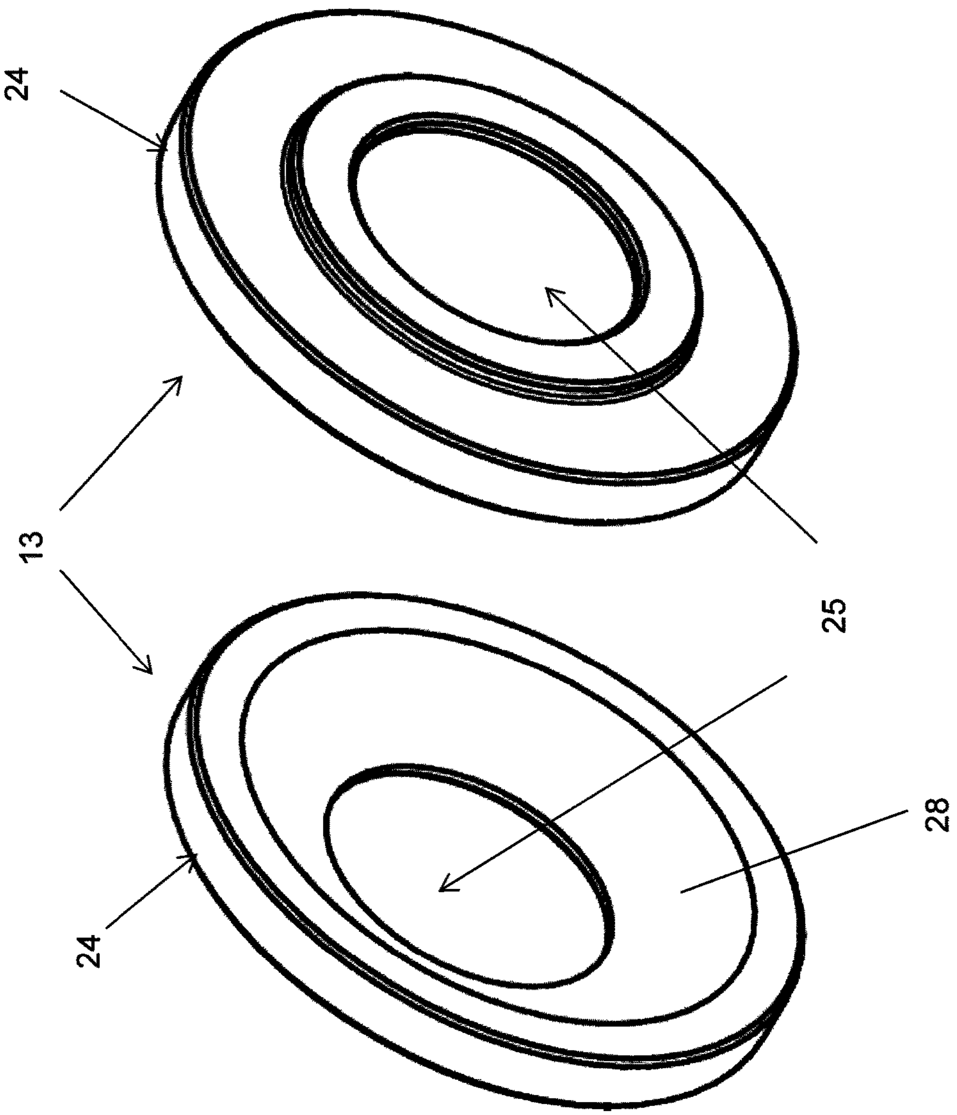
FIG. 2 shows a nozzle ring as a detail in a first embodiment.
Figure 3:
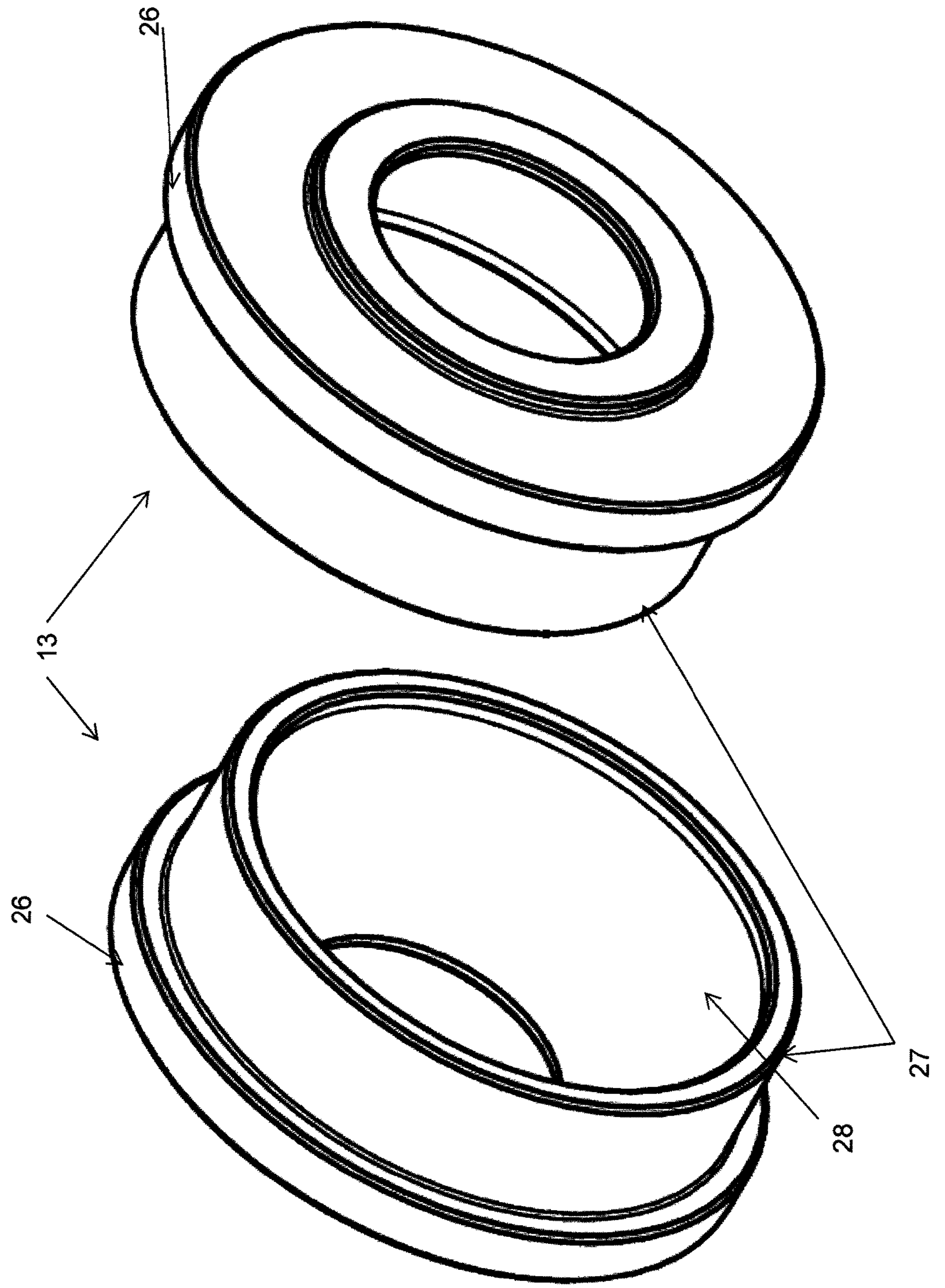
FIG. 3 shows a nozzle ring as a detail in a second embodiment.

In the different figures, identical parts are always provided with the same reference signs, and so said parts are generally also described only once. In FIGS. 2 and 3, the components are each shown in perspective from both sides, i.e. from a lower side and an upper side. In FIGS. 7 to 11, a cross section and a plan view are shown in each case.

Figure 1A:
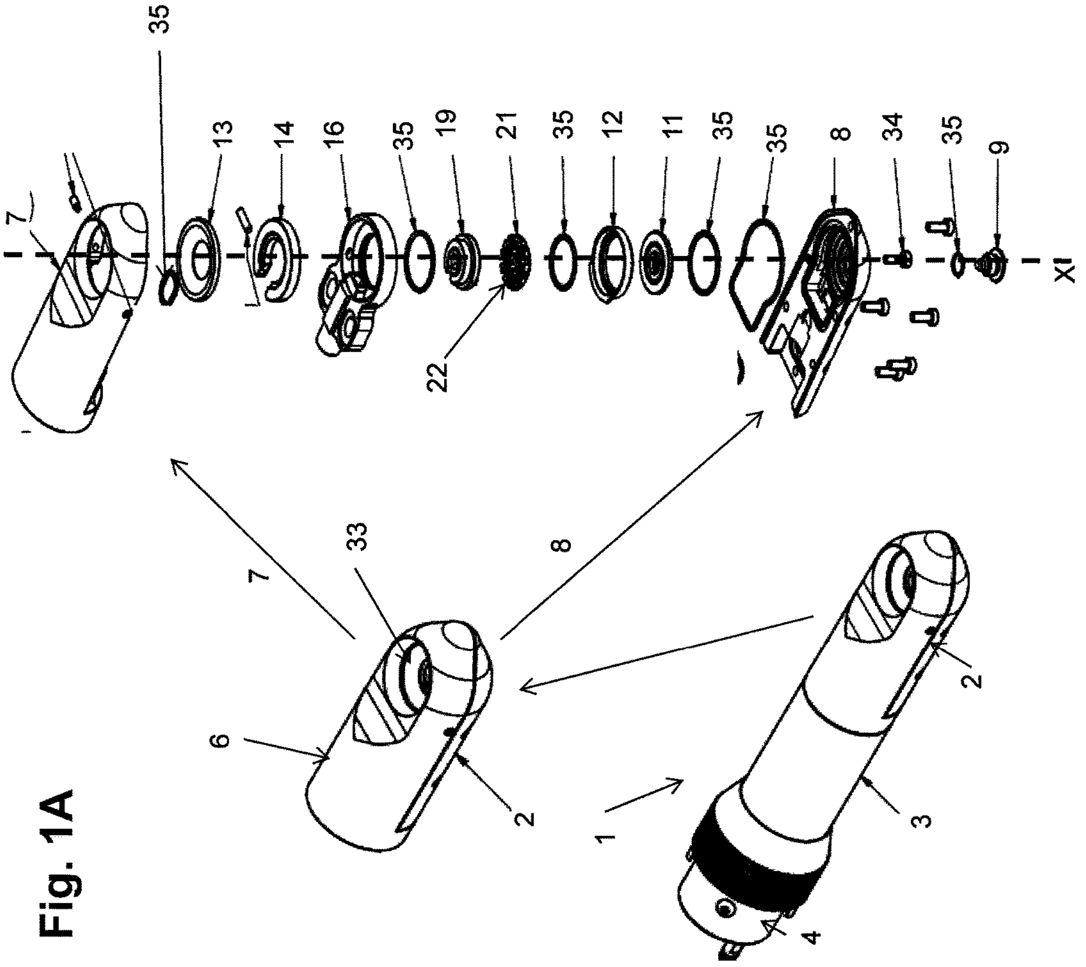
FIG. 1A shows an exploded view of a device for thermally coating a surface.

FIG. 1A shows a device 1 for thermally coating a surface. The device 1 can be referred to as a torch 1, which is suitable for thermally coating a cylinder bore, even one of relatively small diameter of less than 60 mm. For this purpose, an arc is struck in the device 1, said arc melting the sprayed filler material, wherein molten material is carried to the surface to be coated. For this purpose, two gases, namely primary gas and secondary gas, are used. The purpose of the primary gas is to maintain or support the arc, and the primary gas additionally has cooling functions. The secondary gas also has a dual function. On the one hand, the secondary gas is intended to assist transfer of the molten particles and to further atomize and accelerate the particles. On the other hand, the secondary gas has a cooling function, further details of which will be given below. The primary gas can be argon, nitrogen, a mixture of inert gases, or a mixture of the gases given by way of example with hydrogen and/or helium. The secondary gas can be air or compressed air. It is also possible for argon, nitrogen or other inert gases to be used as the secondary gas. Of course, the gases mentioned by way of example are not intended to be restrictive.

The device 1 can have a head part 2, a connector 3 as an intermediate part and an adapter 4 as a connection part, while primary gas connections, secondary gas connections, power source connections, control and monitoring devices and a wire are not shown in FIG. 1A. To coat a cylinder bore, the device rotates upon itself and at the same time is moved linearly backward and forward. Of course, a linear motion of the component to be coated can also be performed instead of the linear motion of the device. Of course, the same also applies to the rotary motion, where expedient.

As illustrated by way of example, the device 1 for thermally coating a surface comprises a two-part housing 6 having a main element 7 and a cover element 8, a cathode 9, a primary gas distributor 11, a secondary gas distributor 12, electrically and thermally acting insulation elements 13, 14 and 16, and an anode, which is designed as a consumable wire and is guided into a secondary gas nozzle 19 by means of a wire guide, wherein a primary gas nozzle 21 is mounted in a centered manner on the primary gas distributor 11 with the secondary gas distributor 12 connected in parallel, and wherein the primary gas nozzle 21 has openings, i.e. holes or slots, arranged radially in one plane on its side 22 oriented toward the secondary gas nozzle 19.

It is expedient if the insulation elements are embodied by a plurality of components in the form of a nozzle ring 13, nozzle insulator 14 and main insulator 16, for example.

The nozzle ring 13 is made from a ceramic material, preferably from a high-performance ceramic material, and has an electrically and thermally insulating effect between the housing 6 and the wire guide. The nozzle ring 13 is the only external insulator in the otherwise metallic external form of the entire device or housing 6.

In one possible embodiment, the nozzle ring 13 is of funnel-shaped design and extends from an outer ring 24 in the direction of a central opening 25 (FIG. 2). It is also possible to embody the nozzle ring 13 in the manner of a sleeve (FIG. 3) with a wall portion 27 extending away from a base flange 26, thus forming an extended version of the nozzle ring 13.

In a preferred configuration of both embodiments, the nozzle ring 13 is polished, preferably to a mirror finish, at least on the outer surface 28 thereof which faces away from the cathode 9, in order to avoid adhesions. The nozzle ring 13 can be of single-part or multipart construction, wherein ceramics or materials such as silicon nitride, aluminum nitride, boron nitride, zirconium oxide, aluminum oxide, ATZ or ZTA can preferably be used to produce the nozzle ring.

Figure 4:
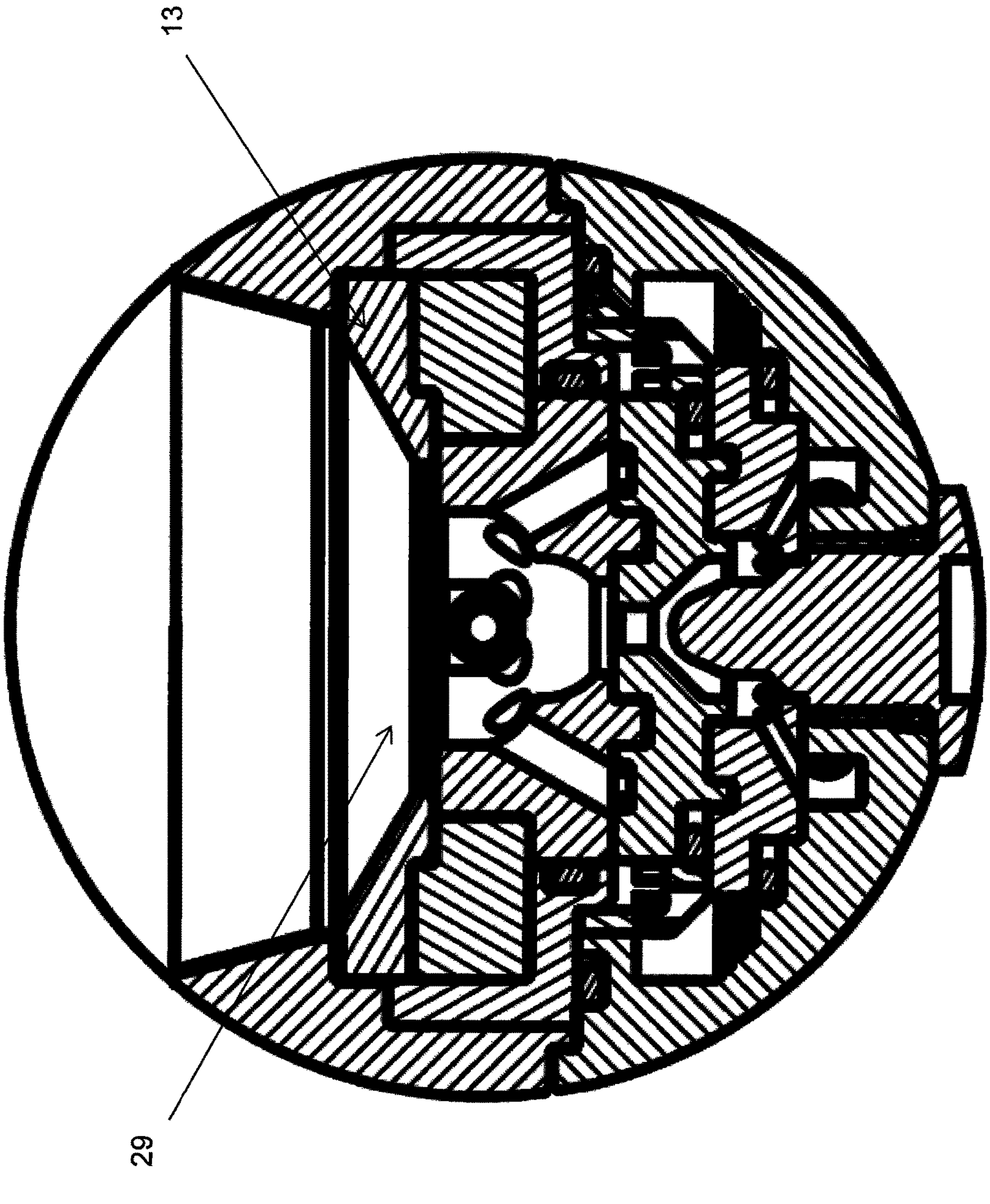
FIG. 4 shows a first possible embodiment of an anti-adhesion surface of the nozzle ring, wherein the nozzle ring is of multipart design and has a partial anti-adhesion and/or insulating surface or layer on the inside.

In order to avoid adhesions on the nozzle ring 13, a number of measures can be provided:

The nozzle ring 13 is of multipart design and has a partial anti-adhesion and/or insulating surface or layer 29 on the inside (FIG. 4).

The nozzle ring 13 is of single-part design and has a partial anti-adhesion and/or insulating surface or layer 29 on the inside and on the outside.

Figure 5:
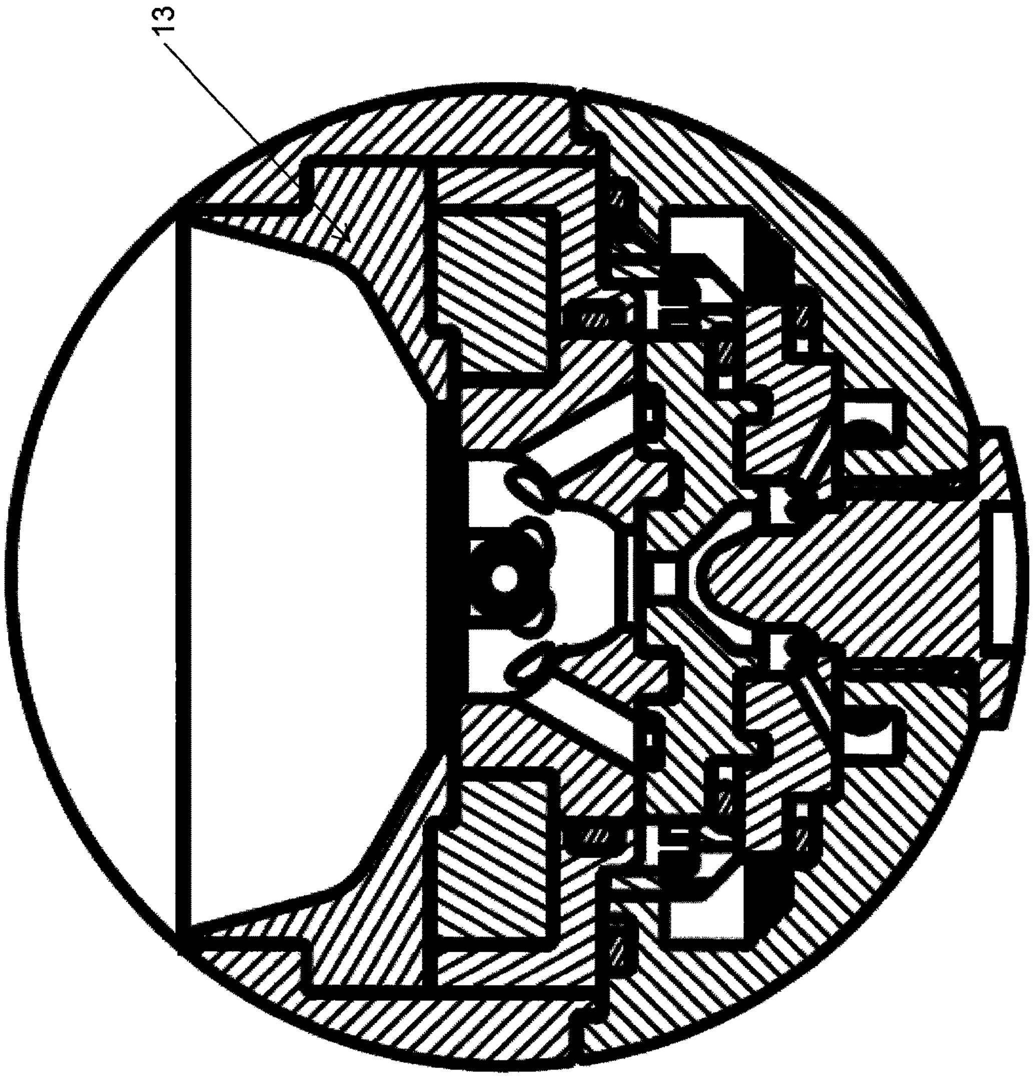
FIG. 5 shows a second possible embodiment of an anti-adhesion surface of the nozzle ring, wherein the nozzle ring is of multipart construction and has an extended configuration.

The nozzle ring 13 is of multipart construction and has an extended configuration (FIG. 5).

Figure 6:
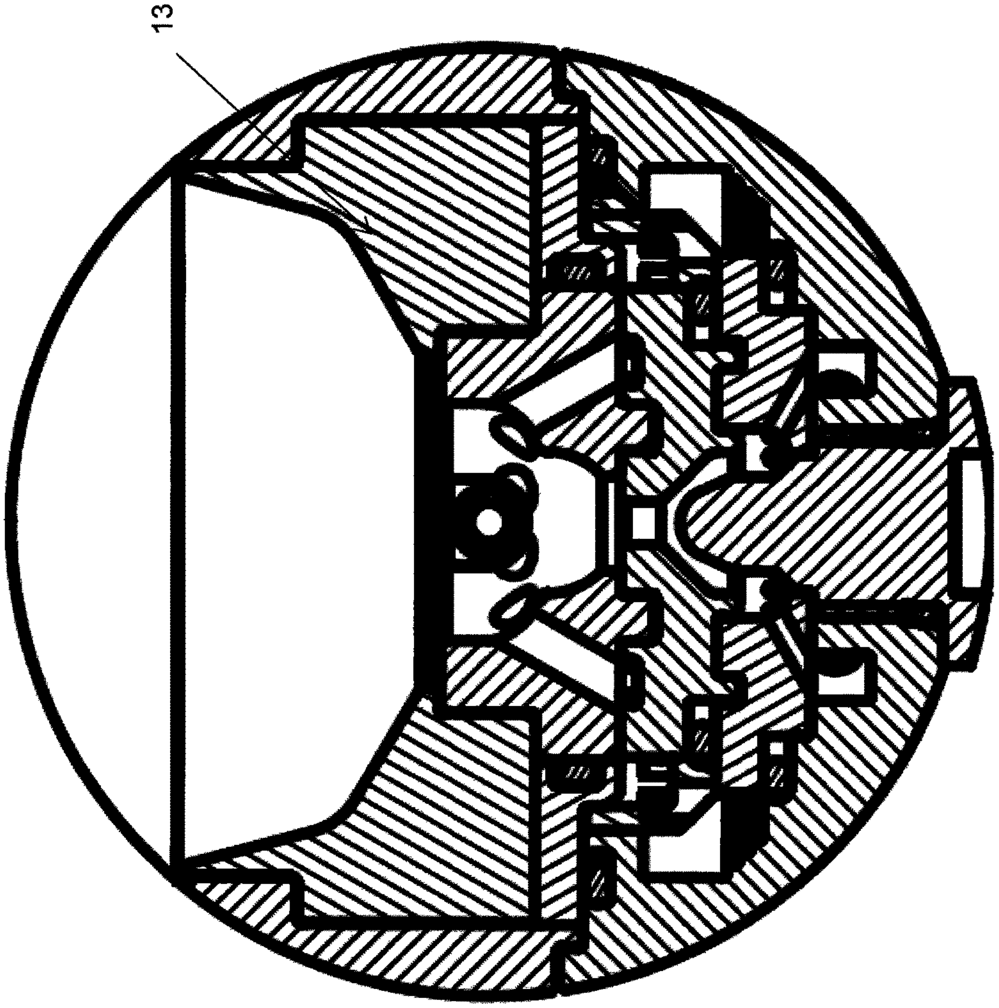
FIG. 6 shows a third possible embodiment of an anti-adhesion surface of the nozzle ring, wherein the nozzle ring 13 is of single-part construction and has an extended configuration.

The nozzle ring 13 is of single-part construction and has an extended configuration (FIG. 6).

Figure 7:
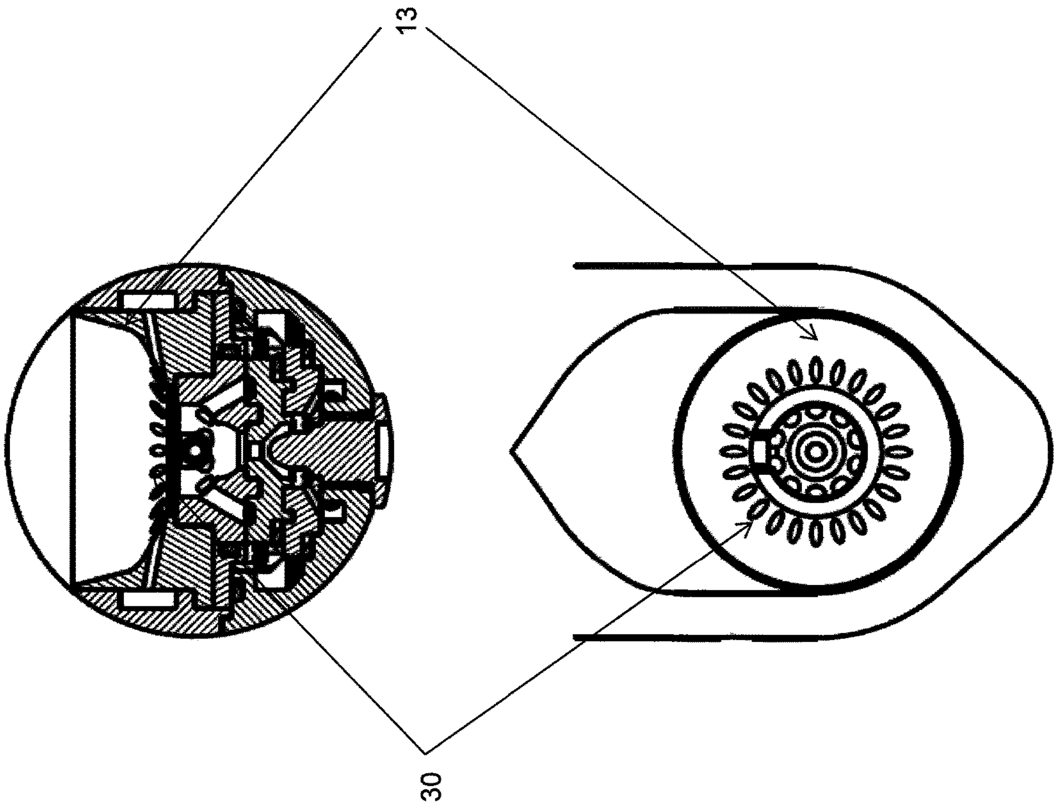
FIG. 7 shows a first possible embodiment of a shielding gas flow, wherein a shielding gas nozzle includes a plurality of holes centrally arranged in a common plane.

The nozzle ring 13 is of single-part construction, being embodied as a shielding gas nozzle with holes 30 centrally in one plane (FIG. 7).

Figure 8:
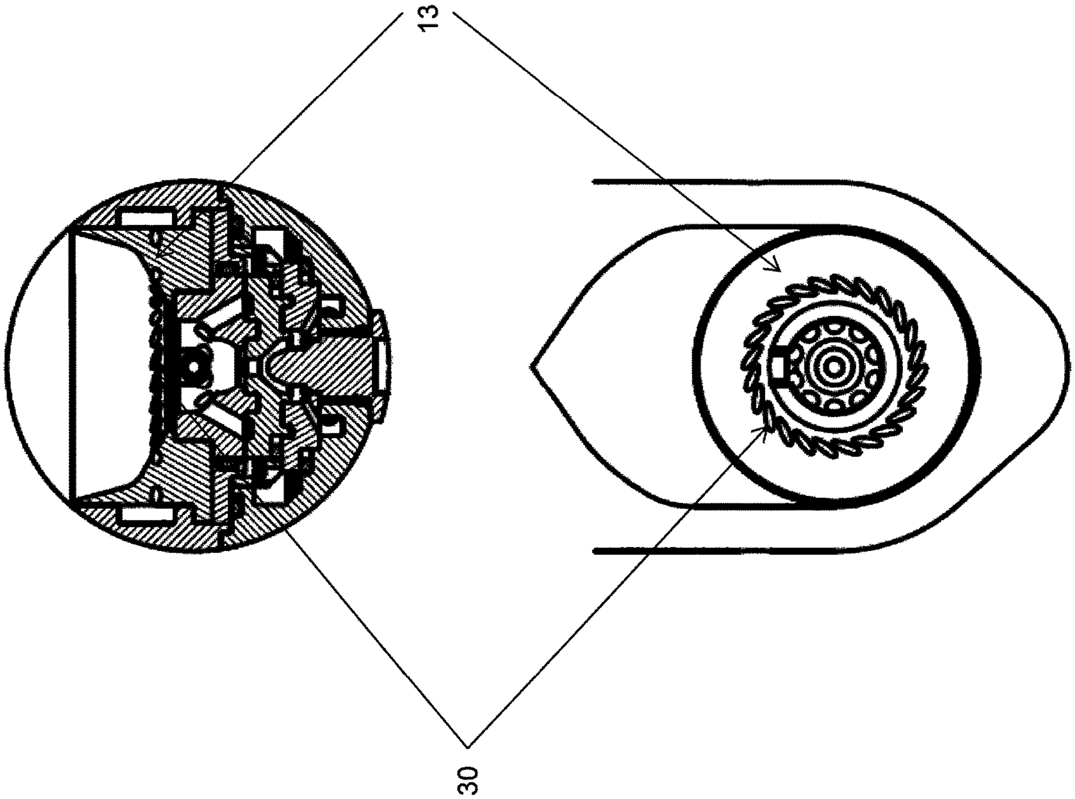
FIG. 8 shows a second possible embodiment of a shielding gas flow, wherein a shielding as nozzle includes a plurality of holes tangentially arranged in a common plane.

The nozzle ring 13 is of single-part construction, being embodied as a shielding gas nozzle with holes 30 tangentially in one plane (FIG. 8).

Figure 9:
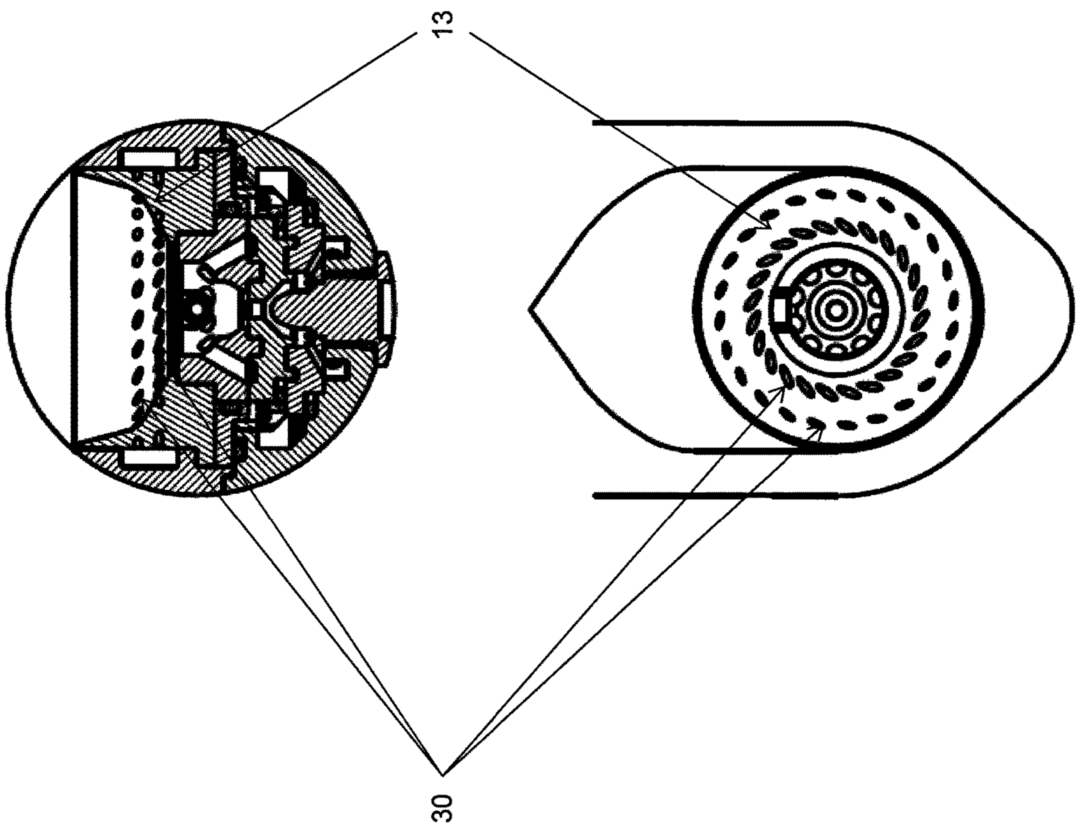
FIG. 9 shows a third possible configuration, wherein a shielding as nozzle includes a plurality of holes tangentially arranged in a plurality of planes.

The nozzle ring 13 is of single-part construction, being embodied as a shielding gas nozzle with holes 30 tangentially in a plurality of planes (FIG. 9).

Figure 10:
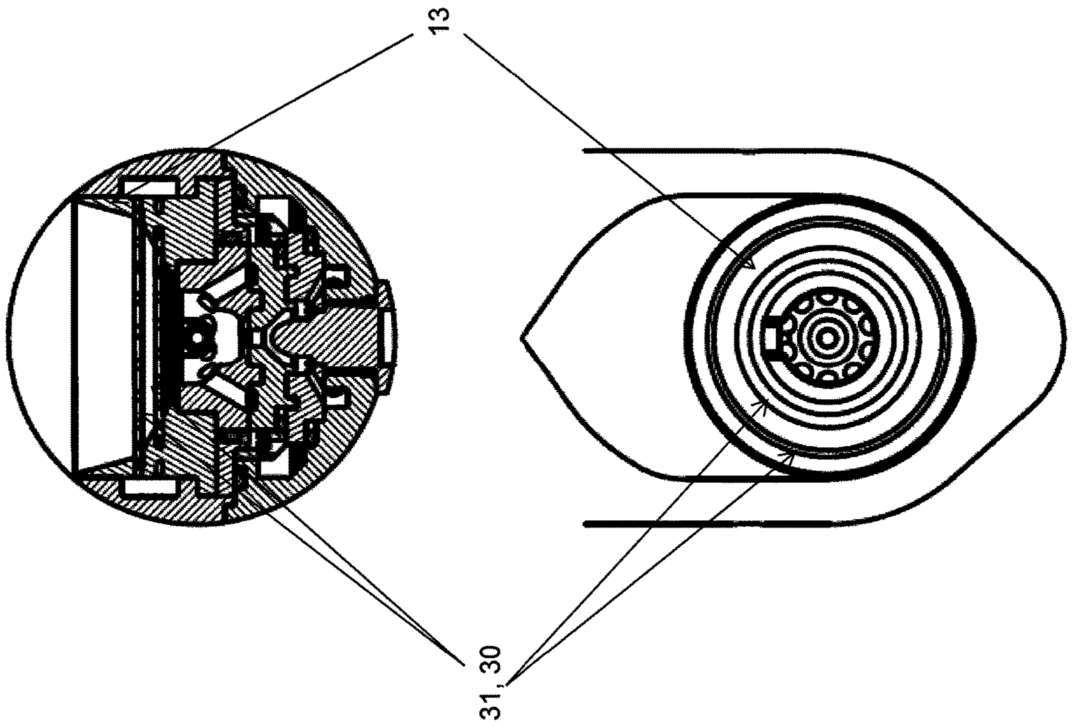
FIG. 10 shows a fourth possible embodiment of a shielding as flow, wherein a shielding as nozzle includes each of a slot and a plurality of holes tangentially arranged in a plurality of planes.

The nozzle ring 13 is of single-part construction, being embodied as a shielding gas nozzle with a slot 31 and holes 30 tangentially in a plurality of planes (FIG. 10).

Figure 11:
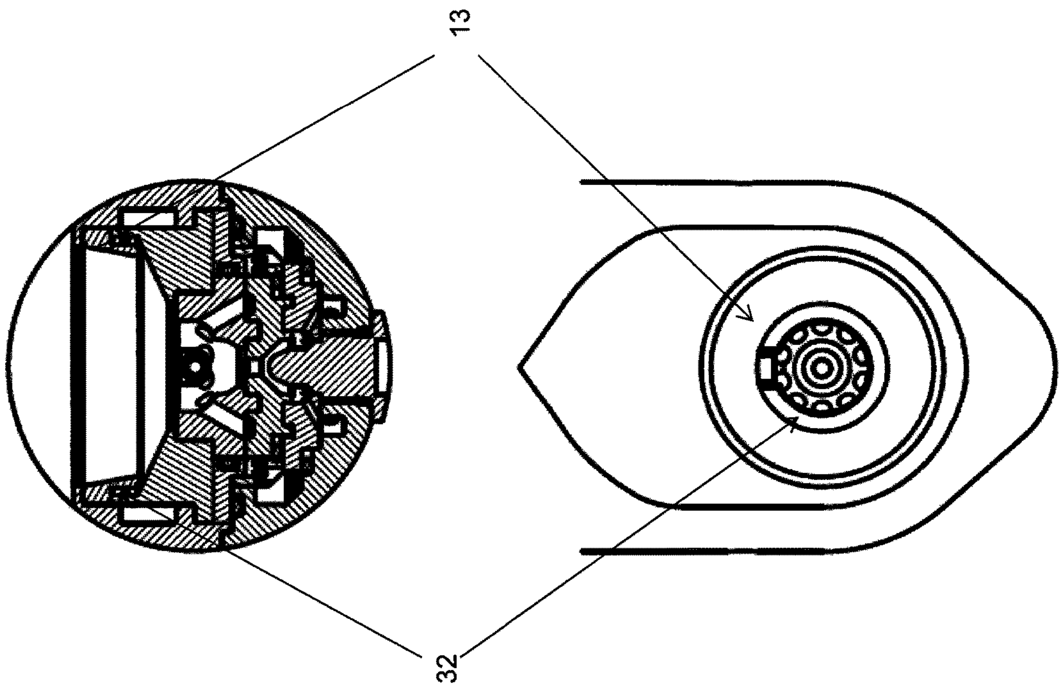
FIG. 11 shows a fifth possible embodiment of a shielding as flow, wherein a shielding gas nozzle includes each of a slot and a plurality of tangential labyrinth holes.

The nozzle ring 13 is of multipart construction, being embodied as a shielding gas nozzle with a slot 31 and tangential labyrinth holes 32 (FIG. 11).

It is advantageous if a shielding gas flow is introduced into the nozzle opening 33 in order to avoid and/or remove reflected and/or deflected particles, wherein the shielding gas flow is produced continuously and/or in a pulsed manner around the spray jet. The nozzle opening 33 is arranged in the flattened part of the housing 6, i.e. the main element 7 thereof, and is also defined by the surface 28 of the nozzle ring 13. The spring jet emerges from the nozzle opening 33. To produce the shielding gas flow, the process gases can be used, all that is necessary being to divert them, and it is possible, in particular, to feed in the secondary gas as the shielding gas. It is also possible to supply other gases as process gases, e.g. air, argon or other gases. The shielding gas can flow through centrally arranged holes 30 and/or tangentially arranged holes 30 in one or more planes of the nozzle ring 13. Moreover, flow can take place through slotted nozzles 31 and/or slotted nozzles 31 with centrally and/or tangentially arranged holes 30 in one or more planes of the nozzle ring 13 in order to stabilize the shielding gas flow. Moreover, the shielding gas flow can take place through slotted nozzles 31 with a labyrinth 32 comprising centrally arranged holes/slots 30/31 and/or tangentially arranged holes/slots 30/31 in order to stabilize the shielding gas flow. The shielding gas forms as it were a protective shield to protect the surface 28, protecting the surface 28 of the nozzle ring 13, i.e. of the nozzle opening 33, from the deposition of said particles.

As already mentioned, the housing 6 is of two-part design by way of example, with the main element 7 and the cover element 8, and this is beneficial for ease of maintenance. As is apparent, the housing 6 is of a predominantly round design. Only in the region of the nozzle opening 33 is the circular configuration of the housing 6, i.e. of the main element 7, as seen in cross section abandoned. Here, the housing 6 is flattened, wherein there is an oblique transition to a plane in which the nozzle ring 13 or nozzle opening 33 is arranged. The consistent retention of the circular housing 6 as seen in cross section avoids a blade effect, i.e. the process gases or air in a cylinder bore being taken along, thereby considerably reducing a negative influence of the blade effect on the particles to be transported in the direction of the surface to be coated. This flow-optimized surface configuration also has an effect in reducing deposits on the housing.

The cover element 8 can be screwed to the main element 7 to form the housing 6 by means of screws 34.

Figure 1B:
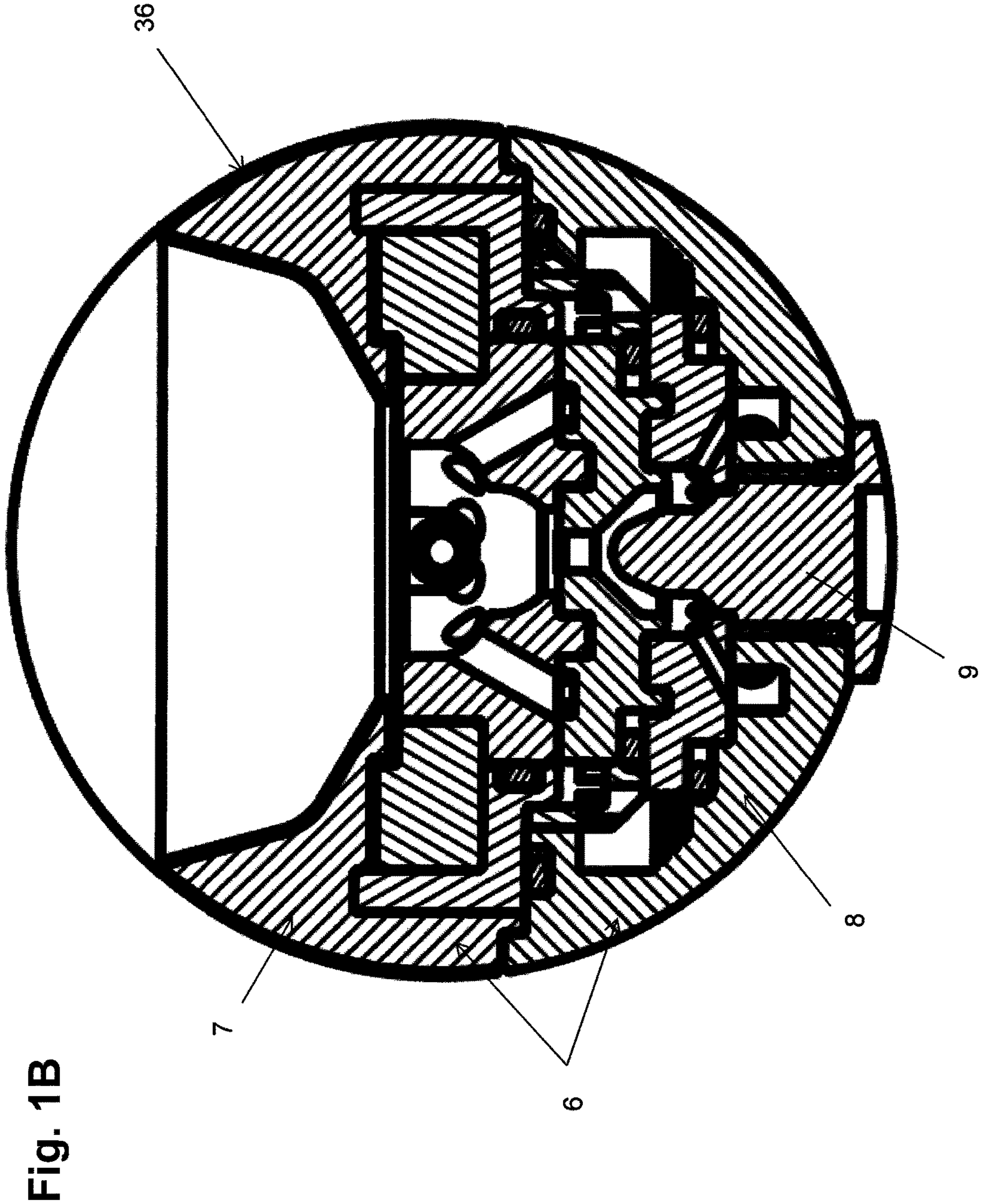
FIG. 1B shows a section through a device according to FIG. 1A.

The housing 6 is preferably formed from brass and has an anti-adhesion surface 36. The anti-adhesion surface 36 can be embodied in such a way that the material of the housing 6 is polished in order to reduce roughness, counteracting deposition on the housing 6. The same applies to the spindle, which is not shown in the figures. As an anti-adhesion surface 36, the housing 6 can also have a coating of a metallic or, preferably, ceramic kind. In the case of the illustrative embodiment shown in FIG. 1B, the anti-adhesion surface 36 is applied as a coating, for example. In FIG. 1B, an anti-adhesion surface 36 of the main element 7 can be seen, by way of example, while a nozzle ring is not visible. Of course, the cover element 8 can also have an anti-adhesion surface.

The invention provides a single-wire spring device 1 which rotates upon itself, by means of which even cylinder bores of relatively small diameter can be coated. The arc to be struck is struck directly between the cathode and the anode, i.e. on the wire, and not between the cathode and the plasma gas nozzle as hitherto known in the known devices, in which the service life was shortened by the effect of the arc, especially at relatively high current intensities. In the invention, the primary gas nozzle 21 is cooled by the secondary gas, for which reason the openings, i.e. slots, are provided. By means of the components comprising the nozzle insulator 14, the nozzle ring 13, the secondary gas nozzle 19, the primary gas distributor 11 and the secondary gas distributor 12, which are preferably formed from a ceramic material, an internal thermal and electrical insulation is as it were advantageously formed. The nozzle ring 13 is virtually the only external insulator in the otherwise metallic external form of the entire device or housing. The wire guide with its components is accommodated completely within the housing 6, i.e. in the main element 7, making it possible to omit external protective measures. Sealing elements 35 can also be seen in FIG. 1A.

LIST OF REFERENCE SIGNS

1 device for thermal coating
2 head part
3 connector
4 adapter
6 housing
7 main element
8 cover element
9 cathode
11 primary gas distributor
12 secondary gas distributor
13 nozzle ring
14 nozzle insulator
16 main insulator
19 secondary gas nozzle
21 primary gas nozzle
22 side 11 oriented toward 19
24 outer ring
25 central opening
26 base flange
27 wall portion
28 outer surface
29 anti-adhesion and/or insulating layer
30 holes
31 slot
32 labyrinth holes
33 nozzle opening
34 screws
35 sealing elements
36 anti-adhesion surface

The invention claimed is:

1. A device for thermally coating a surface, comprising:
at least one housing;
a cathode;
an anode designed as a consumable wire; and
at least one insulation element embodied as a nozzle ring,
wherein an outer surface of the entire device comprises an outer surface of the housing and an outer surface of the nozzle ring;
wherein the outer surface of the housing is a non-detachable metallic anti-adhesion surface, and
wherein the outer surface of the nozzle ring is the only insulator on the outer surface of the entire device, and all other insulators of the device are situated within the housing.

2. The device of claim 1,
wherein the non-detachable metallic anti-adhesion surface of the housing is composed of polished brass.

3. The device of claim 1,
wherein the outer surface of the nozzle ring is oriented away from the cathode and composed of ceramic material polished to a mirror finish.

4. The device of claim 1,
wherein the outer surface of the nozzle ring is an anti-adhesion surface which has been polished to a mirror finish.

5. The device of claim 1,
wherein the outer surface of the housing has a hard-chrome coating as an anti-adhesion surface.

6. The device of claim 1,
wherein the outer surface of the housing has a protective aluminum oxide layer as an anti-adhesion surface.

7. The device of claim 1,
wherein the outer surface of the housing has a protective zirconium oxide layer as an anti-adhesion surface.

8. The device of claim 1,
wherein the outer surface of the housing has an aluminum layer as an anti-adhesion surface.

9. The device of claim 8,
wherein the aluminum layer is oxidized, forming a protective aluminum oxide layer.

10. A device for thermally coating a surface, comprising:
a two-part housing including a main element and a cover element;
a cathode;
an anode;
a primary gas distributor;
a secondary gas distributor; and
a nozzle ring having a polished insulating outer surface oriented away from the cathode,
wherein the anode is designed as a consumable wire and is guided into a secondary gas nozzle by means of a wire guide;
wherein the two-part housing is configured to accommodate the wire guide completely within the main element thereof;
wherein a primary gas nozzle is mounted in a centered manner on the primary gas distributor with the secondary gas distributor connected in parallel;
wherein an outer surface of the entire device comprises an outer surface of the two-part housing and the outer surface of the nozzle ring;
wherein the outer surface of the two-part housing is a non-detachable metallic anti-adhesion surface; and
wherein the outer surface of the nozzle ring is the only insulator on the outer surface of the entire device, and all other insulators of the device are situated within the housing.

11. The device of claim 10, wherein the primary gas nozzle has openings arranged radially in one plane on a side oriented toward the secondary gas nozzle.

12. The device of claim 11, wherein the nozzle ring is formed from an electrically and thermally insulating element, and wherein the primary gas nozzle directs gas through a central opening of the nozzle ring.

13. The device of claim 12, wherein the nozzle ring further comprises a plurality of holes centrally arranged in a common plane.

14. The device of claim 12, wherein the nozzle ring further comprises each of an annular slot and a plurality of holes tangentially arranged along a plurality of planes.

15. The device of claim 13, wherein the nozzle ring further comprises each of an annular slot and a plurality of tangential labyrinth holes.

16. A method for thermally coating a surface, comprising:
striking an electric arc directly between a cathode and an anode of a thermal coating device, wherein said anode is a consumable wire configured to be guided by a wire guide accommodated completely within a housing of the device;
flowing a first process gas stream around the electric arc from a primary gas nozzle; and
flowing a second process gas stream around the first process gas stream,
wherein the first process gas stream is flowed through a plurality of holes or slots in the primary gas nozzle, arranged radially thereon in a first common plane, said holes oriented away from the cathode,
wherein the second process gas stream is flowed through a nozzle ring having an insulating outer surface which is polished to a mirror finish, said nozzle ring further including a central opening through which the first process gas stream from the primary gas nozzle flows,
wherein an outer surface of the entire device comprises an outer surface of the housing of the device and the outer surface of the nozzle ring,
wherein the outer surface of the housing is a non-detachable metallic anti-adhesion surface, and
wherein the outer surface of the nozzle ring is the only insulator on the outer surface of the entire device, and all other insulators of the device are situated within the housing.

17. The method of claim 16, wherein flowing the second process gas stream from the nozzle ring includes atomizing a molten portion of the anode and accelerating said molten portion away from the cathode in a direction of the electric arc.

18. The method of claim 16, wherein the first process gas stream is a noble gas stream produced in a continuous manner, and wherein the second process gas stream is an air stream produced in a pulse manner.

19. The method of claim 16, wherein flowing the second process gas stream through the nozzle ring further includes flowing the second process gas stream through each of an annular slot extending in a first plane of the nozzle ring and a plurality of tangentially arranged holes at a second common plane of the nozzle ring.

20. The device of claim 10, wherein the two-part housing has a predominantly circular cross-section which is flattened only in a region of the nozzle ring, and wherein there is an oblique transition from a portion of the two-part housing having a circular cross-section of the two-part housing to a plane in which the nozzle ring is arranged.

* * * * *